United States Patent [19]

Dodt

[11] 4,020,684
[45] May 3, 1977

[54] CONTROL VALVE ESPECIALLY FOR HYDRAULIC ABSORPTION DYNAMOMETERS

[75] Inventor: Hans-Walter Dodt, Darmstadt, Germany

[73] Assignee: Carl Schenck AG, Darmstadt, Germany

[22] Filed: June 21, 1976

[21] Appl. No.: 697,775

[30] Foreign Application Priority Data

Mar. 1, 1976 Germany ............... 2608374
July 26, 1975 Germany ............... 2533514

[52] U.S. Cl. ...................... 73/134; 188/296
[51] Int. Cl.$^2$ ............................ G01L 3/20
[58] Field of Search .......... 73/134, 133 R; 188/296

[56] References Cited

UNITED STATES PATENTS

| 2,976,960 | 3/1961 | Bathurst | 188/296 |
| 3,033,321 | 5/1962 | Evans et al. | 73/133 R |
| 3,138,954 | 6/1964 | Evans et al. | 73/134 |
| 3,364,736 | 1/1968 | Bathurst et al. | 73/134 |

Primary Examiner—Charles A. Ruehl
Attorney, Agent, or Firm—W. G. Fasse; W. W. Roberts

[57] ABSTRACT

A control valve absorption dynamometers has a closed end discharge conduit forming a cylinder with discharge openings in the cylinder walls. A floating piston is movable in the cylinder to vary the area of the discharge openings. A first piston surface is subject to the pressure at the exit port of the dynamometer or to the pressure downstream of a butterfly valve arranged between the piston and the exit port of the dynamometer. A second piston surface which may be smaller than the first piston surface is subject to pressure from the dynamometer exit or from a pump whereby the piston is moved for varying the area of discharge openings in the cylinder wall. The intake of the pump may be connected to the inlet or exit port of the dynamometer. Flow control means may be located directly next to said exit port in said discharge conduit to convert a turbulent flow into a uni-directional flow.

15 Claims, 7 Drawing Figures

- - - - = LINES OF CONST. FILLING
——— = PRESSURE LINES

CONTROL VALVE ESPECIALLY FOR HYDRAULIC ABSORPTION DYNAMOMETERS

BACKGROUND OF THE INVENTION

The invention relates to control valves especially adapted for absorption dynamometers such as so called eddy brakes. The discharge conduit is connected to the housing of the dynamometer. An adjustment valve may be arranged between the exit port of the brake and the valving mechanism proper.

It is known to vary the exit openings of the discharge conduit connected to hydraulic dynamometer brakes. With the aid of such variation of the exit area, it is possible to vary the filling condition in the brake independently of the pressure in the brake. However, it has been found that dynamometer brakes controlled in this manner exhibit differing control characteristics in different points of operation, especially when the loading or the load removal takes place rapidly. The valve means employed heretofore, for the just described purposes are normally of the slide valve type whereby the slide proper is subject to the pressure resulting from the dynamic flow conditions. Thus, it is necessary to employ relatively large adjustment mechanisms for controlling the adjustment valve.

From German Pat. No. 728,010 and German Patent Publication No. 1,011,171 it is known to vary the size of the exit area for the work liquid flowing out of a dynamometer brake, by means of a valve which is connected to a piston. The piston is subject to the feed pressure of a rotary pump which in turn is driven by the shaft of the brake. However, the valve structures required for this type of apparatus are relatively complicated and expensive.

Further difficulties are encountered due to the pressure delivered by the rotary pump. If the rotary pump is dimensioned in approximation to the blade or vane arrangement of the dynamometer brake, the rotary pump will deliver a very low pressure at low rpms. Accordingly, it is necessary to provide for special structural features for achieving the required brake pressure. For example, it may be necessary to subject additional piston surfaces with a pressure effective in the same direction and which is larger than the pressure delivered by the rotary pump. On the other hand, at large rpms the rotary pump produces a very high pressure which is substantially above the pressure required for the valve adjustment.

According to another known control mechanism disclosed in German Pat. No. 744,509 the valve located in the discharge conduit of the dynamometer brake is connected to a displacement member, for example a piston, and subjected to the pressure delivered by a displacement pump which is driven by the rpm of the dynamometer brake. In this prior art device, the displacement member such as a piston or membrane is subjected to an oil pressure in a closed oil circulatory system which is separate from the working liquid, such as water used in the hydraulic brake. The size of the exit area is controlled or rather varied by the separate oil pressure. Accordingly, it is necessary to provide a seal between the valve and the displacement member. The resulting friction causes an operation of the control mechanism which is not precise and in addition, is subject to hysteresis deficiency. Besides, the structure of the control mechanism is rather complicated and expensive.

In view of the above difficulties, it has been preferable heretofore to employ electronic control devices for the adjustment of dynamometer brakes such as water eddy brakes. However, especially in connection with relatively small dynamometer brakes, the costs of the electronic control devices amount to a very large proportion of the total production costs of the dynamometer brake. Thus, in many instances smaller brakes and brakes already in operation have not been provided with a control mechanism at all in view of the high costs.

Further, in connection with brakes of the type described herein it has been noted that the filling condition of the dynamometer brake and the input power were subject to slight changes without any noticeable external influences. Such changes were particularly observed in the lower half of the power range of the hydraulic dynamometer brake and at rpms in the upper quarter of the rpm range of the respective brake. Such changes are beleived to be due to turbulent flow conditions in the area of the exit port of the hydraulic dynamometer brake.

OBJECTS OF THE INVENTION

In view of the foregoing it is the aim of the invention to achieve the following objects, singly or in combination:

to provide a control valve mechanism for a hydraulic dynamometer brake which valve mechanism provides for a uniform, advantageous control characteristic over the entire power or operational range of the brake while simultaneously requiring but a small force for the control operation, that is, for its adjustment;

to minimize the pressure difference against which the valve adjustment must be performed, in other words, the difference in pressure on opposite sides of the valve adjustment member shall be small so that the forces effective on the adjustment member for accomplishing the adjustment are substantially reduced.

to construct the valve mechanism in such a manner that the displacement member is subject to the pressure at the exit port of the brake whereby to prevent a too rapid discharging even at operational points with a low filling condition in the brake and with a respective high pressure at the brake exit port so that the displacement member does not increase the discharge opening area much faster than at an operational point in which a large filling condition is present in the brake and a respective small pressure prevails inside the brake, whereby the operation of the control valve apparatus system is substantially the same at these two extreme points and at all operational points between these two extreme points;

to construct a control valve apparatus especially suited for dynamometer hydraulic brakes so that the valve mechanism is of simple structure and responds substantially without delay while operating substantially without friction;

to avoid electronic control means for dynamometer brakes of the type here described while simultaneously assuring a control substantially free of delays;

to avoid friction between the control member such as a piston and its cylinder, so that the control mechanism may operate without hysteresis deficiencies;

to avoid turbulent flow conditions at the exit port of the brake housing so as to assure a stable operation of the control valve mechanism over the entire operational range especially in the lower half of the power range of the hydraulic dynamomter brakes and at rpms in the upper quarter of the rpm range of such brakes; and to employ the working liquid of the brake also for the adjustment of the valve thereby reducing leakage problems.

SUMMARY OF THE INVENTION

According to the invention there is provided a control valve mechanism for hydraulic dynamometer brakes, wherein a discharge conduit forming a cylinder is connected to the exit port of the brake. A movable valve member such as a floating piston is arranged in the cylinder which has discharge openings in its cylinder walls. The movable piston varies the exit area of these discharge openings. The surface of the piston facing toward the exit port of the brake is subjected to the pressure at such exit port or to a reduced pressure resulting from the insertion of an adjustment valve between the exit port and said surface of the piston. The opposite surface of the piston, preferably of smaller area, is subjected to a controlled pressure for the adjustment of the piston position. Such controlled pressure may be derived substantially from the exit port of the brake or from a pump connected in conduit means between the inlet or exit port of the brake and the closed end of the cylinder in which said piston floats back and forth for varying the area of the discharge openings in the cylinder wall.

Preferably, in the embodiment where the pressure is provided through a pump the piston floats in the cylinder forming the discharge conduit and one side of the piston is subject to the pressure at the exit port while the other opposite side is subjected to the pressure from the pump, whereby the adjustment valve between the piston and the exit port of the brake may be obviated, if desired. The embodiment employing the pump has the advantage that even with very small pump pressures which may be produced by a small simple displacement pump, it is possible to provide a rapid and precise discharge area adjustment even for large dynamometer brakes having respectively large discharge areas.

In order to assure a stable operation of the control valves throughout its operational range there is further provided, according to the invention, a flow control device located directly adjacent the exit port of the brake. For example, the flow control device such as a plurality of parallel pipes would be located between the exit port and the adjustment valve such as a butterfly valve. These parallel pipes convert a turbulent flow into an even uni-directional flow. The uni-directional flow has the advantage of stabilizing the control. An additional important advantage is seen that the forces resulting from the flow, and which are effective on both halfs of the butterfly valve member are substantially equal to each other, whereby the butterfly valve member may be adjusted by a smaller adjustment force. In other words, the adjustment motor for the butterfly valve and the respective power supply may now be smaller than heretofore.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
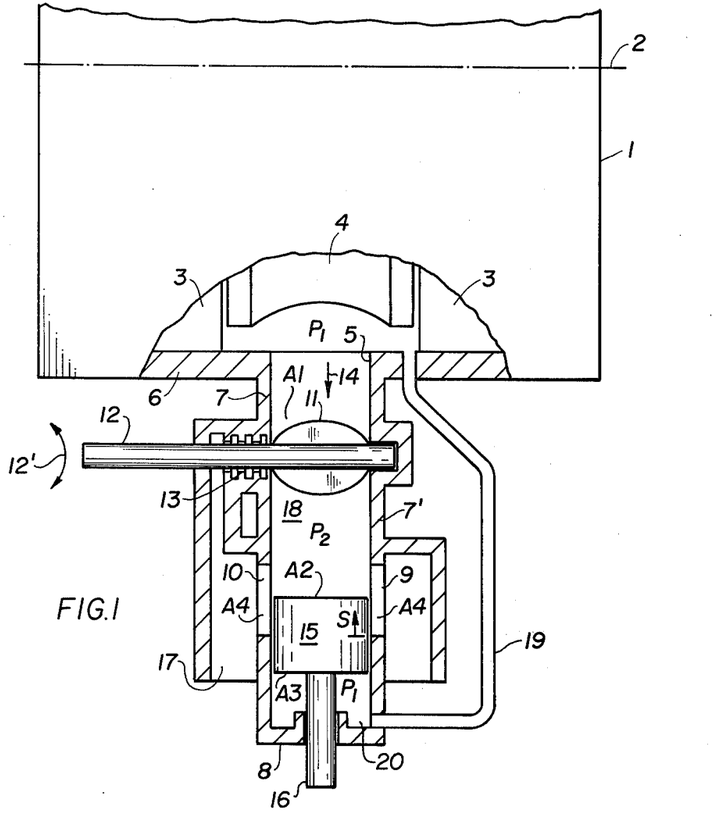
FIG. 1 is a simplified illustration of one embodiment of a control valve apparatus according to the invention connected to a hydraulic dynamometer brake.

FIG. 1 shows schematically a hydraulic dynamometer brake 1 having a rotational axis 2. The two stators 3 are arranged to the right and left of a double rotor 4. The exit port 5 of the brake housing 6 is connected to discharge conduit means 7 having a closed end 8 except for a piston stem passage. The valve mechanism according to the invention is housed in the discharge conduit 7 and controls or regulates the pressure P1 prevailing at the exit port 5 of the brake.

The discharge conduit 7 forms a cylinder 7' having lateral discharge openings 9 and 10. Each of these discharge openings 9 and 10 has a surface area A4. An adjustment valve means, such as a butterfly valve member 11 secured to a control rod or shaft 12 is located in the discharge cylinder 7' substantially adjacent to, but downstream of the exit port 5. The cross sectional area A1 of the discharge conduit 7 may be varied by turning the butterfly valve member 11 as shown by the double arrow 12'. The control rod or shaft 12 of the valve 11 is supported for rotation by conventional means and sealing rings 13 are arranged where the control rod 12 extends through the side wall of the discharge conduit 7. The adjustment of the rod 12 may be accomplished, for example, by an electric motor not shown.

A valve member 15 such as a floating piston is located in the cylinder 7' downstream of the butterfly valve member 11 as viewed in the flow direction 14 from the exit port 5 to the discharge openings 9, 10. The piston 15 has a piston rod or stem 16 extending in a sealed manner through the otherwise closed end 8 of the cylinder 7'. The outer free end of the piston rod 16 may reach into a dashpot or the like not shown for damping the movement of the floating piston 15. The above mentioned discharge openings 9, 10 lead into a discharge pipe 17 whereby the space 18 between the butterfly valve 11 and the piston 15 communicates with the discharge pipe 17. The pressure P2 prevails in this just mentioned space 18.

The pressure P2 in the embodiment of FIG. 1 is effective on the first surface area A2 of the piston 15 facing toward the exit port 5. A pressure conduit 19 connects the space 20 below the piston 15 to the housing of the brake 1 substantially adjacent to the exit port 5 whereby the pressure prevailing at that point is transmitted to the second surface A3 of the piston 15 for controlling the extent of the movement S of the piston 15 for varying the size of the areas A4.

The working liquid, normally water, is supplied to the dynamometer brake through channels or conduits leading into respective eddy chambers not shown. These channels or conduits lead from an inlet port or ports through intermediate walls of the stators 3 into the eddy chamber. After passing through the brake 1 the working liquid flows through the exit port 5 and, depending on the position of the butterfly valve member 11, which determines the size of the passage area A1, the liquid flows out through the lateral openings 9, 10 with the above mentioned surface areas A4. Depending on the position of the butterfly valve member 11 the pressure P1 will vary in the rotor space adjacent to the exit port 5. This pressure P1 is balanced by the pressure generated at the interfaces from the rotor 4 and the two stators 3 by the water rotating in the eddy chambers of the brake.

The surface A2 of the piston 15 faces toward the exit port 5 or rather, toward the butterfly valve member 11 and is thus exposed to the pressure P2 in the space 18 below the valve member 11. The lower surface A3 of the piston 15 is smaller than the first surface A2, due to the reduction resulting from the cross sectional surface area of the valve stem 16. This smaller surface A3 is exposed to the pressure P1 through the conduit 19. In an equilibrium position of the piston 15, the areas A4 of the discharge openings 9, 10 are of such a size that the pressure P2 in the space 18, keeps the piston 15 in equilibrium relative to the pressure P1 in the chamber 20. This condition is met if the following equation is satisfied:

$$P2 \cdot A2 = P1 \cdot A3.$$

Thus, the ratio A2 to A3 determines the constant pressure ratio P1 to P2. This ratio may, for example, correspond to 1.3. In the example the maximum required pressure P1 = 6.0 bar results in a pressure below the valve member 11 in the space 18, corresponding to P2 = 4.6 bar. Under this condition the displacement S of the piston 15 is a maximum whereby the surface areas A4 have their minimum size. In other words, most of the exit openings 9, 10 are covered up by the piston 15 at this equilibrium point of operation.

If the butterfly valve member 11 is slightly rotated in the opening directon to somewhat increase the passage area A1, a slight increase in the pressure P2 downstream of the valve member 11 will occur, whereby somewhat more water flows out. As a result of this, the brake pressure P1 is reduced and the equilibrium of the piston 15, or rather of the forces effective on the piston 15, is disturbed whereby the piston 15 moves away from the valve member 11 until the resulting increase in the cross sectional areas A4 of the discharge openings 9, 10 is again sufficiently large to reestablish the predetermined pressure ratio P1 to P2.

The smallest required pressure P1 = 0.06 bar calls for a respective smallest pressure P2 = 0.046 bar. The discharge openings 9 and 10 are dimensioned with due regard to these pressures and with due regard to the quantity of water to be expected to flow through these openings. Similar considerations apply to dimensioning the passage area A1. When the maximum of water quantity flows through the openings 9, 10 the piston 15 will be in its lower position completely opening the full cross sectional areas A4.

Figure 2:
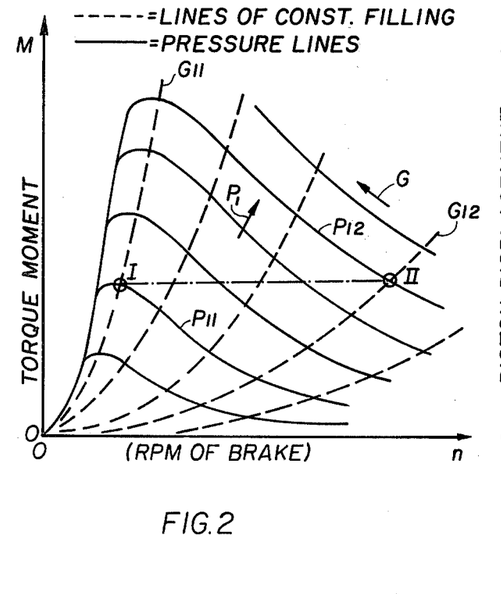
FIG. 2 illustrates a diagram of torque moments shown as functions of the rpm of the brake; lines of constant pressures and constant filling conditions in a hydraulic dynamometer brake are also shown in this figure.
Figure 3:
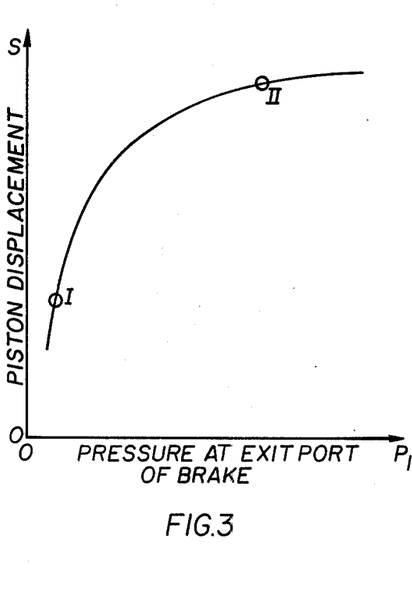
FIG. 3 is a curve illustrating the piston displacement S as a function of the pressure p1 at the exit port of the dynamometer brake.

Referring to FIGS. 2 and 3 it will be shown that according to the invention a uniform control characteristic is accomplished for different working or operational points especially in connection with discharge or brake emptying operations.

The full lines in FIG. 2 illustrate different brake pressures P1 .... The dashed lines in FIG. 2 represent constant working liquid fillings in the brake. Two operational points I and II will be compared with each other. Operational point I is defined at the intersection of pressure line P11 and filling line G11. Operational point II is defined at the intersection of pressure line P12 and filling line G12. A relatively low operational brake pressure P11 prevails at the working point I. Simultaneously a relatively large quantity of liquid G11 is in the brake. On the other hand, a larger operational pressure P12 and a relatively smaller quantity G12 of liquid in the brake prevail at the working point II. Considering first the loading operation and assuming that the piston 15 is not present at all and under the further assumption that a constant quantity of water flows into the brake, it will be noted that the loading is the same in both instances when the valve member 11 is rapidly adjusted. On the other hand, the discharging would take place much more rapidly in the operational point II than the discharging of liquid from the brake in the operational point I because in point II a smaller quantity of water would be discharged at a much higher pressure than in point I wherein a large quantity of water is present under relatively low pressure. As a result, the discharge in point I would be much slower than the discharge in point II through the fully open discharge areas A4.

On the other hand, when the piston 15 is present to vary the discharge areas of the piston is subject to the pressure prevailing in the respective operational point and thus controls the size of the discharge areas A4 in such a manner that the discharge operation at point II (small liquid quantity under high pressure) requires the same time sequence as in point I (large liquid quantity under low pressure). This feature of the invention is an important advantage because it provides for a uniform control response characteristic of the hydraulic dynamometer brake over a wide operational range.

FIG. 3 illustrates the piston displacement S of the piston 15 in response to the change in the pressure P1 at the exit port 5 of the brake. For the illustration of FIG. 3 it is assumed that the discharge openings 9, 10 have a rectangular shape. However, the invention is not limited to such a rectangular shape of the discharge openings 9, 10. In the operational point I the discharge areas A4 are substantially all open. On the other hand, in the operational point II the discharge areas A4 are substantially closed by the piston 15 as may be seen by the respective larger piston displacement corresponding to operational point II. In operational point II the discharge operation is delayed due to the inertia of the piston 15 and due to the throttle effect in the conduit 19. This delay may however, be influenced by selecting a suitable mass for the piston 15 by properly dimensioning the cross sectional area of the conduit 19, and by the shape of the discharge openings 9, 10. These openings could be triangular, or round or oval, or any other configuration could be selected. Further, the piston rod or stem 16 extending out of the closed end 8 of the cylinder 7' may reach into a dumping means such as a dashpot for influencing the speed of movement of the piston 15, especially during discharge operations.

In order to achieve an especially quick discharge operation as is desirable, for example, in connection with the examination of the downward control characteristic of engines or motors, there may be provided in addition to the control valve apparatus described, a so called quick opening valve which facilitates the rapid discharge of the working liquid from the dynamometer brake. Such a rapid opening valve may be operated by air pressure or by electromagnetic means and is well known in the art. An acceleration of the discharge operation may also be accomplished in the apparatus according to the invention and which may be satisfactory for many testing conditions, by releasing the pressure from the space 20 a short time prior to the desired control action. Still another posibility of a rapid discharge may be accomplished by pulling the piston 15 downwardly at its stem 16 and by simultaneously fully opening the adjustment of member 11.

In the light of the above description of the embodiment of FIG. 1, it will be appreciated that the piston 15 simultaneously operates as the displacement member and the slide which controls or varies the opening areas A4. This is an advantage of the invention since it simplifies the valve structure and reduces sealing problems.

By constructing the adjustment of valve 11 as a rotary butterfly valve member rather than as a sliding member, the advantage is achieved that the control can be accomplished by rapidly operating simple adjustment drive means such as an electric dc motor. Since there is only a slight pressure difference upstream and downstream of the valve member 11, the load on the bearings and the friction of the adjustment shaft 12 is minimized whereby the power required for adjusting the valve member 11 is also small.

By arranging the piston 15 and the butterfly valve member 11 in a common cylinder housing 7' a desirably complex structure is accomplished. The compactness is even enhanced by extending the piston stem 16 out of the housing and by connecting the conduit 19 as shown.

Figure 4:
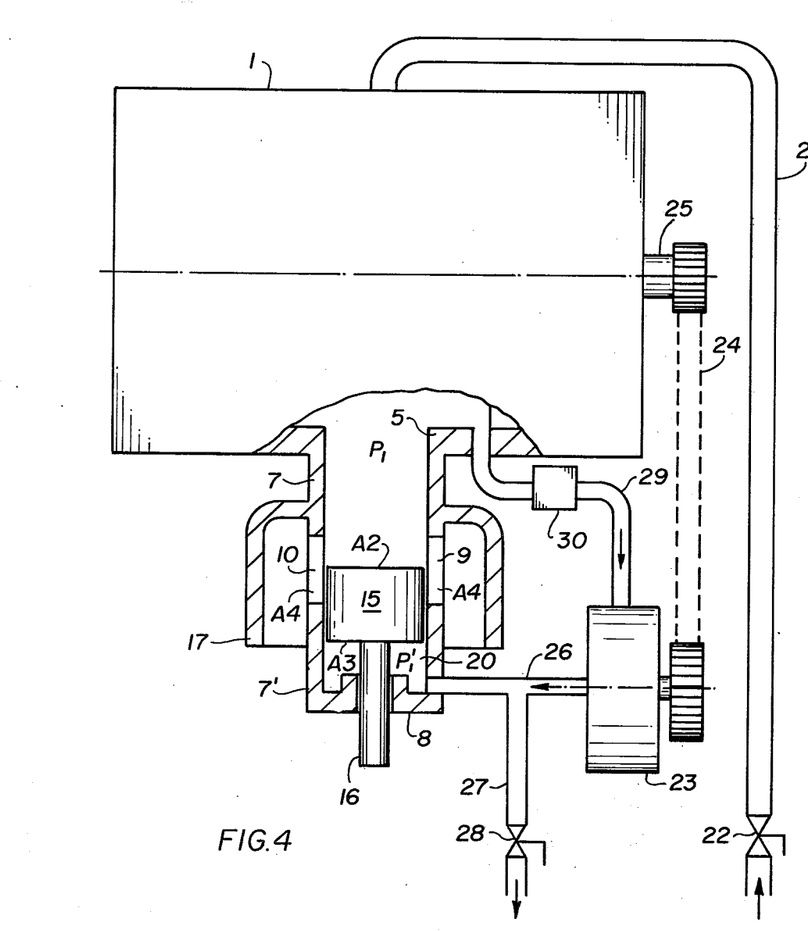
FIG. 4 is a view similar to that of FIG. 1 but showing a modified embodiment of the invention wherein the pressure for the control of the valve member is produced by a rotary pump connected substantially between the exit port of the brake and the opposite end of the floating valve member.

FIG. 4 illustrates a modification of the valve apparatus according to the invention. However, the same elements are designated by the same reference numbers as in FIG. 1. The embodiment of FIG. 4 does not employ the butterfly adjustment valve. Therefore, the discharge conduit 7, 7' can be somewhat shorter and still more compact than in FIG. 1. As in FIG. 1, the discharge openings 9 and 10 lead into a discharge pipe 17. In the embodiment of FIG. 4 the hydraulic dynamometer brake 1 such as a water eddy brake, is supplied through the inlet pipe 21 and the valve 22 with the working water. The drive means for the brake and the power take off means are not shown for simplicity's sake and since these elements are not part of the invention. The water, which simultaneously cools the brake, is discharged with the working pressure P1 at the exit port 5 of the brake 1. This working pressure P1 is effective on the surface A2 of the piston 15 in the discharge conduit 7, 7' which may be connected to the exit port 5 by flange means or the like not shown.

The discharge conduit forms a cylinder housing 7' for the piston 15. The piston floats in the cylinder. For this purpose a gap surrounds the piston 15 as in FIG. 1. The width of the gap may be, for example, 0.1 to 0.2 mm. The piston stem 15 facilitates the guiding of the piston movement. The discharge openings 9 and 10 in FIG. 4 are formed as straight slots or they may have a triangular shape with the base of the triangle at the upper or lower edge of the respective opening 9, 10. The discharge pipe 17 leads to a supply container or simply to a drain.

As mentioned, the pressure P1 is effective directly on the piston surface A2 which is contrary to the embodiment of FIG. 1, wherein the valve member 11 provides for an intermediate pressure P2. The other smaller surface A3 of the piston 15 is subject to a pressure P1' which is produced by a pump 23 such as a rotary displacement pump, for example, a gear pump, a piston pump, or a gear ring pump, or the like. The pump 23 is driven through a gear belt 24 from the shaft 25 of the brake 1. Thus, the rpm of the pump 23 is proportional to the rpm of the brake 1. The pressure exit port of the pump 23 is connected to the space 20 below the cylinder 15 by a pipe 26. A branch pipe 27 having a valve 28 therein branches off from the pipe 26. The valve 28 is an adjustable valve for controlling the pressure P1' which also depends on the rpm of the displacement pump 23.

The suction inlet port of the pump 23 is connected through a pipe 29 substantially to the exit port 5 of the brake 1. A filter 30 is connected in the pipe 29. The pressure P1 and the housing of the brake 1 thus appears at the inlet port of the pump 23. The quantity of water pumped by the pump is very small relative to the quantity of water discharged through the openings 9, 10. Accordingly, the pump 23, the pipes 26, 27 and 29 as well as the valve 28 and the filter 30 may have relatively small dimensions.

Since the quantity of the liquid Q is proportional to the rpm $n$ of the pump 23, it can be shown that this quantity is substantially discharged through the passage area A of the valve 28, thus:

$$Q \sim A \cdot \sqrt{P1'}$$

The pressure P1' effective on the area A3 of the piston 15 may be expressed as follows:

$$P1' \sim \frac{1}{A^2} \cdot n^2$$

If the adjustment of the valve 28 remains constant ($A$ = constant) then the pressure P1' is directly proportional to the square of the rpm of the brake 1. The working pressure P1 in the brake or rather at the brake exit port 5 increases with the square of the rpm of the brake. Moreover, the quantity of the filling water in the eddy chamber of the brake remains constant and the torque-rpm-characteristic curves are parabolas satisfying the equation $$M = a \cdot n^2 \quad (a = \text{coefficient})$$

whereby the exponent $x$ is close to 2. Pressure variations in the water supply in the inlet pipe 21 have no influence in this context. Thus, the invention has the advantage that a pressure control means or a high level container, which were necesssary heretofore for achieving a constant inlet pressure to the brake, have been obviated according to the invention.

Figures 5, 6:
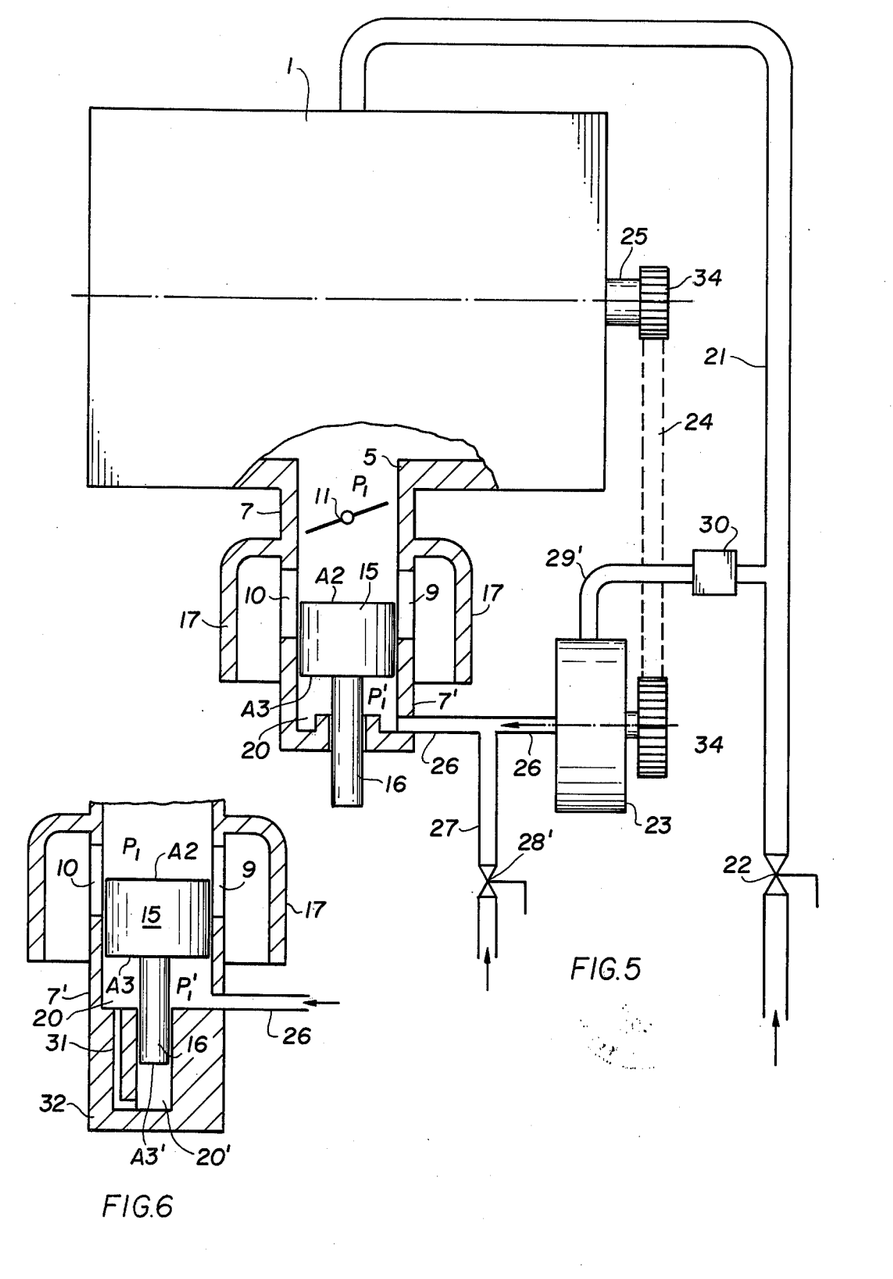
FIG. 5 illustrates an embodiment similar to that of FIG. 4, however, the section or inlet port of the displacement pump is connected to the inlet port or supply conduit of the brake.
FIG. 6 shows a modification in which the effective surface area of the valve member is of the same size at both ends of the balve member.

As mentioned in connection with FIG. 1 the surface area A3 of the piston 15 is smaller than the surface A2 due to the fact that the piston stem 16 reduces the effective surface area at the low end of the piston. Thus, the pump 23 has to pump only at a constant pressure ratio P1 to P1'. Accordingly the required pumping power and wear and tear on the pump 23 are rather small. FIG. 6 shows an embodiment in which the effective surface areas at both ends of the piston are equal to each other because the surface areas A3 and A3' are both effective due to the conduit 31 which connects the space 20 to a further space 20' below the free end of the piston stem 16 which reaches into an extension 32 of the cylinder 7'. In this instance, if the two piston surface areas are equal to each other, the pump 23 becomes a simple dosage pump, disregarding the slight flow resistance in the pump inlet conduit 29 and in the pump exit conduit 26. In the embodiment of FIG. 6 the pressure P1' is effective on the surface area A3 as well as on the surface A3' due to the conduit 31.

In those instances where the working water of the brake 1 might be contaminated, it is suitable to keep the pressure P1' slightly higher than the pressure P1 to prevent water from passing through the gap around the piston 15. To this end the surface area A3 would be made slightly smaller than the surface area A2. With this feature water would flow upwardly past the cylinder rather than the other way around whereby it is assured that contaminated water in the space above the piston 15 is prevented from entering into the space 20 below the piston 15.

FIG. 5 shows an embodiment similar to that of FIG. 4, however, the inlet pipe 29' for the pump 23 is connected to the water supply pipe 21 of the brake 1 rather than substantially to the exit ports as in FIG. 4. The filter 30 is again located in the suction pipe 29' of the pump 23. In this embodiment the pressure of the liquid flowing into the pipe 29' is substantially constant corresponding to about up to 0.4 bar. This inlet pressure depends on the adjustment position of the valve 22 in the supply pipe 21. The valve 22 is used to adjust the quantity of water required for the operation of the brake 1.

The control of the brake is accomplished in the embodiments of FIGS. 4 and 5 by the adjustment of the valve 28 whereby the exit areas A4 are adjusted practically without any delay and without any hysteresis defects. The valve 28 may be adjusted in response to any control value suitable for the particular type of brake operation or rather application. For example, the brake can be controlled for an operation with a constant rpm. Similarly, it is possible to control the brake for a constant torque operation.

As in FIG. 1, it is also possible to employ in the embodiment, for example, of FIG. 5 an additional adjustment means such as a butterfly valve 77 arranged in the discharge conduit 7. It will be appreciated that this is optional. By adjusting the valve 77 it is possible to provide for a parallel shift of the brake characteristic curve.

Incidentally, in FIG. 5, just as in FIG. 4 the pump 23 can be driven through reduction gear means 34 and the gear belt 24 whereby the rpm of the pump 23 would be lower than the rpm of the brake 1.

Since the working liquid of the brake 1 is water, which has a kinematic viscosity that is 60 times smaller than that of oil, the reaction times of the control mechanism of the invention is for that reason alone substantially smaller than in prior art devices in which oil is employed as the pressure medium.

Another advantage of the invention especially of the embodiment according to FIGS. 4, 5, and 6 is seen in that the length of pipes required according to the invention is rather small in comparison to respective pipe lengths in prior art devices employing a pressure oil circuit. This feature also contributes to the rapid reaction of the present control mechanism which operates substantially without delay. Moreover it is advantageous that leakage problems have been eliminated by employing the same working medium, namely water, for the operation of the brake itself and for the control mechanism.

The embodiment of FIG. 4 has the advantage that the exit pressure P1 is already relatively high so that the pump 23 does not have to overcome a large pressure differential. The pump may be of small dimension and its wear and tear is substantially reduced. In the embodiment of FIG. 6 the pump 23 becomes a simple dosage pump which merely has to overcome the flow resistance in the pipe so that it may be even smaller and its wear and tear is still further reduced.

In the embodiment where the surface A3 of the piston 15 is slightly smaller than the surface A2 of the piston, the advantage is achieved that no water can leak from the space above the piston into the space below the piston. This is, for exammple, desirable when the working liquid is contaminated water.

The embodiment of FIG. 5 takes advantage of the fact that the inlet pressure to the brake 1 is substantially constant. Thus, the inlet pressure to the pump 23 is also substantially constant because the suction pipe 29' of the pump is connected to the inlet pipe 21 of the brake 1. This may be advantageous in certain respects. For example, the temperature of the fresh water supply is usually low and the liquid at the inlet of the brake is usually not yet contaminated, for example, by boiler scale or the like.

Figure 7:
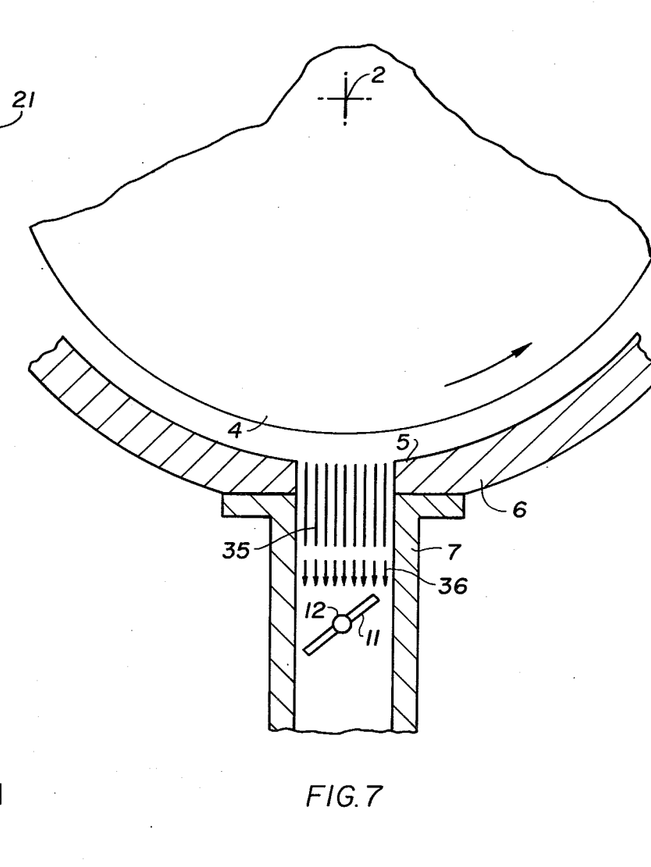
FIG. 7 illustrates a sectional view through the exit port of a dynamometer brake whereby the sectional plane extends perpendicularly to the rotational axis of the brake to illustrate a flow control device for eliminating turbulent flow through the exit port.

FIG. 7 illustrates a modification of the invention in which flow control means 35 are arranged immediately adjacent to the exit port 5. The section of FIG. 7 extends perpendicularly to the rotational axis 2 of the rotor 4 in the housing 6 of the brake 1. The flow control means 35, for example, a plurality of pipes arranged in parallel to each other, are so dimensioned that their upper end is flush with the plane defined by the exit port 5 at the inner surface of the housing 6 and that the opposite end of these pipes 35 reaches into the discharge conduit 7 toward the butterfly valve member 11. These parallel pipes 35 convert any turbulent flow that might be present at the exit port 5 into a uni-directional flow thereby avoiding the turbulence that otherwise might be caused by the liquid in the brake housing impinging upon the edge facing against the rotational direction of the rotor 4. Such turbulence can cause pressure drops at the exit port 5. Such pressure drops in turn cause changes in the filling quantity of the brake as well as in the power characteristic of the brake. Another disadvantage of a turbulent flow is seen in that it applies different load conditions to the two wings of the butterfly valve member 11. The parallel pipes 35 avoid these difficulties. These pipes 35 may have any desired cross section such as circular or hexagonal or any other suitable cross section.

These pipes may be realized by tubular members having relatively thin walls or by sheet metal channels. In the latter embodiment a plurality of sheets of metal could be arranged in parallel to each other whereby, as desired, another set of sheet metals could run at right angles to a first set of sheet metals. However, a plurality of flat parallel channels would also be sufficient for the present purpose to assure a uniform, parallel flow free of turbulences through the discharge conduit 7 forming the valve housing as described above. The embodiment of FIG. 7 has the advantage that it eliminates uncontrollable pressure drops at the exit port 5 of the brake and thus keeps the degree of filling in the brake constant. Another advantage is seen in that the forces of the uni-directional flow 36 as caused by the flow control means 35 provide a uniform load on both wings of the butterfly valve member 11. This in turn has the advantage that the control motor connected to the shaft 12 of the butterfly member 11 can be dimensioned smaller than heretofore. The same applies to the power supply for the control motor of the butterfly valve 11.

The flow control means 35 physicaly or geometrically reduce the cross sectional flow area at the exit port 5. However, it has been found that the elimination of turbulences resulting from the flow control means, in fact increases the effective cross sectional area at the exit port 5. This is a surprising result.

Although the invention has been described with reference to specific example embodiments, it will be appreciated, that it is intended to cover all modifications and equivalents within the scope of the appended claims.

What is claimed is:

1. In a control valve apparatus, especially for hydraulic absorption dynamometer means having exit port means leading into closed end discharge conduit means for the liquid, the improvement comprising lateral discharge opening means in said discharge conduit means, a displacement member movable in said discharge conduit means for varying the area of said lateral discharge opening means, said displacement member having a first surface facing toward said exit port means and a second surface facing away from said exit port means toward said closed end of said discharge conduit means, and pressure supply means operatively connecting said dynamometer means to said closed end of said discharge conduit means, whereby said second surface of said displacement member is exposed to a predetermined pressure.

2. The control valve apparatus according to claim 1, further comprising adjustment valve means located in said discharge conduit means between said exit port means and said first surface of said displacement member, whereby said first surface is subject to the pressure downstream of said adjustment valve means, said second surface of said displacement member being smaller in area than the area of said first surface of said displacement member, said pressure supply means comprising a conduit connected substantially between said exit port means and said closed end of said discharge conduit means whereby said displacement member varies the size of the area of said lateral discharge openings.

3. The control valve apparatus according to claim 2, wherein said displacement member is a piston floating in said discharge conduit means forming a cylinder said lateral discharge openings being located in said cylinder, said first surface forming one end of said piston, said second, smaller surface forming the other end of said piston.

4. The control valve apparatus according to claim 2, wherein said adjustment valve means comprise a tiltable butterfly valve.

5. The control valve according to claim 4, wherein said butterfly valve and said displacement member forming a piston, are both located in series in said discharge conduit means forming a cylinder, said piston having stem means extending in a sealed manner through said closed end of said cylinder, said pressure supply means operatively connecting the smaller surface of said piston with said stem to a point substantially adjacent to said exit port means upstream of said discharge conduit means.

6. The control valve apparatus according to claim 1, wherein said displacement member is a piston floating in said discharge conduit means, forming a cylinder whereby said first piston surface is substantially subject to the pressure at said exit port, said pressure supply means comprising pressure conduit means connected to said discharge conduit means below said piston and to said dynamometer means, and pump means in said pressure conduit means whereby the piston is subjected on the said second surface by the pressure medium pumped by said pump means to vary the area of said discharge opening means.

7. The control valve apparatus according to claim 6, further comprising throttle valve means operatively connected to said pressure conduit means.

8. The control valve apparatus according to claim 6, wherein said pump means is a displacement pump means, said apparatus further comprising drive means for said pump means and means connecting said drive means to said dynamometer means whereby said pump means are driven with the rpm of said dynamometer means.

9. The control valve apparatus according to claim 8, wherein said pressure conduit means are connected to said exit port means, and to said closed end of said discharge conduit means, whereby said pump means transport working liquid of said dynamometer means substantially from said exit port means to said second piston surface.

10. The control valve apparatus according to claim 6, further comprising working liquid supply conduit means operatively connected to said dynamometer means, said pressure conduit means being connected to said closed end of said discharge conduit means and to said working liquid supply conduit means, whereby said pump means transport working liquid from said working liquid supply conduit means to said second piston surface.

11. The control valve apparatus according to claim 6, wherein said first and second piston surfaces are of equal surface area, whereby the surface area subject to pressure from said pump means is the same as the surface area subject to pressure from said exit port means.

12. The control valve apparatus according to claim 6, wherein said first piston surface subject to pressure from said exit port means is larger than the second piston surface subject to pressure from said pump means.

13. The control valve apparatus according to claim 6, further comprising flow turbulence control means located in said discharge conduit means at said exit port means.

14. The control valve apparatus according to claim 1, further comprising flow turbulence control means located in said discharge conduit means at said exit port means.

15. The control valve apparatus according to claim 14, wherein said flow control means comprise a plurality of pipe means arranged in parallel to each other, said pipe means having upstream ends arranged in a common plane coinciding with the inner surface defining said exit port means.

* * * * *